Figure 1:
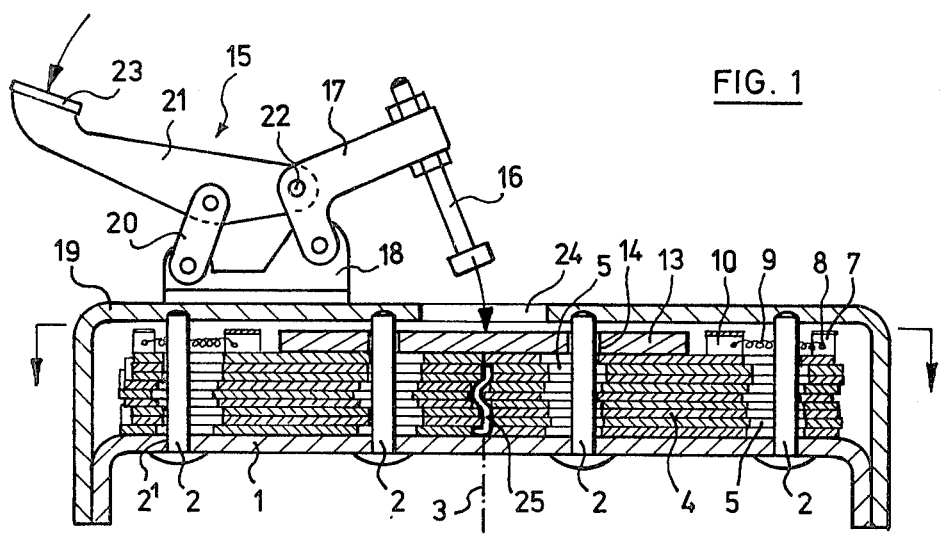

United States Patent [19]

Troillet

[11] 4,233,746
[45] Nov. 18, 1980

[54] DEVICE FOR TESTING THE SECTION OF A FLAT KEY

[76] Inventor: Willy Troillet, 48, Chemin de Cressy, CH-1213 Onex, Geneva, Switzerland

[21] Appl. No.: 28,676

[22] Filed: Apr. 10, 1979

Related U.S. Application Data

[63] Continuation of Ser. No. 873,942, Jan. 31, 1978, abandoned.

[30] Foreign Application Priority Data

Jan. 31, 1977 [BE] Belgium ................................ 850914

[51] Int. Cl.³ .............................................. G01B 5/20
[52] U.S. Cl. ...................................... 33/174 F; 33/175
[58] Field of Search ................ 33/174 F, 175, 174 PA

[56] References Cited

U.S. PATENT DOCUMENTS

| 341,572 | 5/1886 | Hand | 33/175 |
| 874,091 | 12/1907 | Levncke | 33/175 |
| 1,665,721 | 4/1928 | Stockton | 33/175 |
| 1,826,783 | 10/1931 | Hess | 33/175 |

FOREIGN PATENT DOCUMENTS

| 12020 of 1910 | United Kingdom | 33/175 |
| 4267 of 1911 | United Kingdom | 33/174 F |
| 762779 12/1956 | United Kingdom | 33/175 |

Primary Examiner—Richard R. Stearns

[57] ABSTRACT

A device for testing or checking the section of a flat key comprising a base plate, a plurality of laminations, each of which is formed of a pair of half-laminations which are slidably mounted with respect to one another in their common plane towards one another so that their respective juxtaposed edges may meet with one another and away from one another to allow insertion of a flat key or a blank of a flat key to be tested. The half laminations are held in place by a pressure applying device once they have reached a position which corresponds to the desired cross-sectional profile of the flat key.

6 Claims, 4 Drawing Figures

DEVICE FOR TESTING THE SECTION OF A FLAT KEY

This is a continuation, of application Ser. No. 873,942, now abandoned, filed Jan. 31, 1978.

The present invention relates to a device for testing the section of a flat key having been copied from an original key.

It is well known that generally the reproduction of a flat key takes place from a blank having been machined on a copying machine using as the model the original key or a key requiring to be copied.

It is also well known that these copying machines have machining tolerances which are frequently higher than the tolerances applicable to the lock itself.

It is therefore essential to test the copied key, on the one hand in respect of the shape of the teeth and on the other hand in respect of the thickness or, to be more accurate, the section of the key.

With regard to inspection of the section, this has hitherto been limited to checking the thickness of the key by means of a caliper or micrometer.

It has, however, been found that such inspection was not satisfactory, particularly because the copied key frequently is not able to be introduced into the associated lock.

This invention aims to provide a simple and practical device whereby such testing can be carried out absolutely satisfactorily.

With this object in view, the device making the subject matter of the invention is characterised essentially in that it comprises laminations which are superimposed in two elements (half-laminations) which come into contact by juxtaposed edges, and an assembly for applying pressure to the stack of laminations, and in that means are provided by which when a key has been introduced between the juxtaposed edges of the laminations, each of the half-laminations making part of a lamination may be moved apart horizontally to the exterior.

In order that the invention be well understood an example of embodiment will be described with reference to the drawings and after the description of the construction of the machine, it will be explained how the checking of a key is executed.

Figure 2:
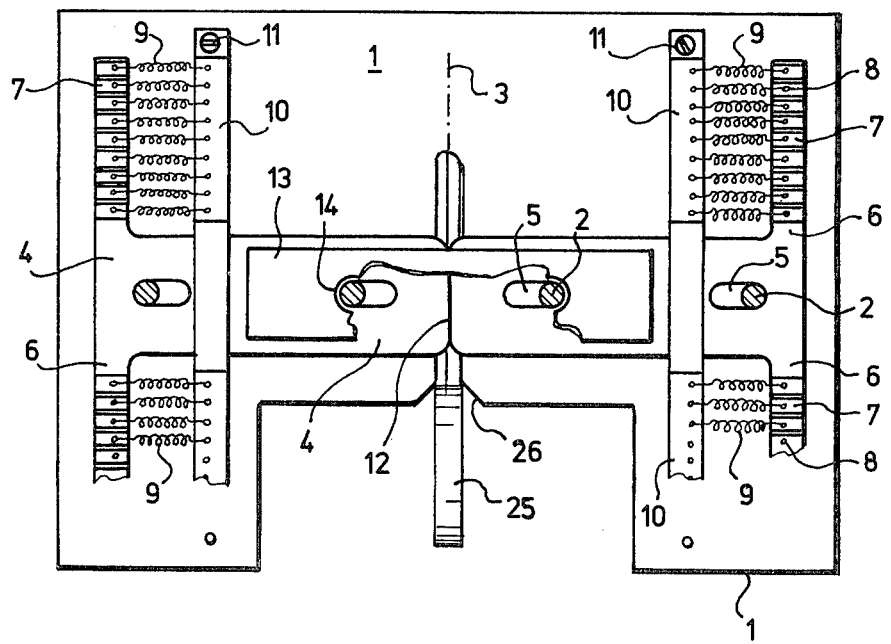
Figure 3:
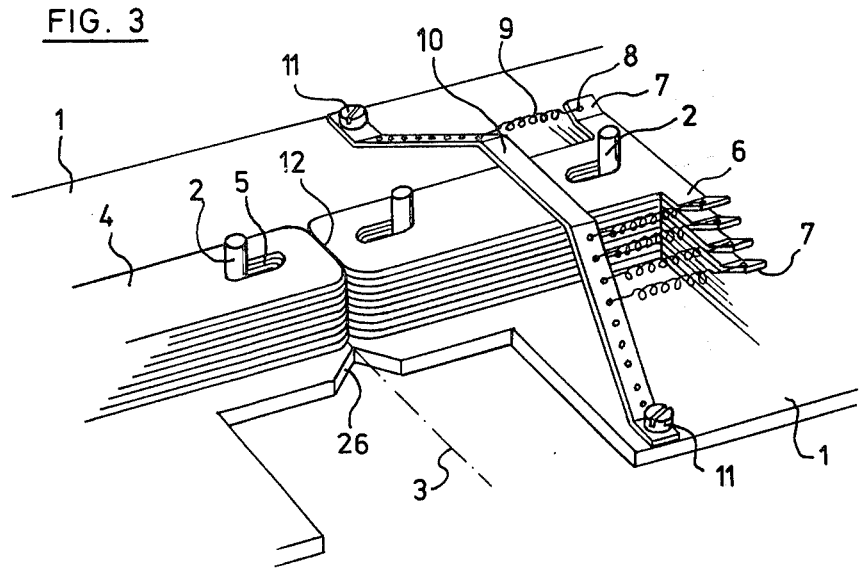
Figure 4:
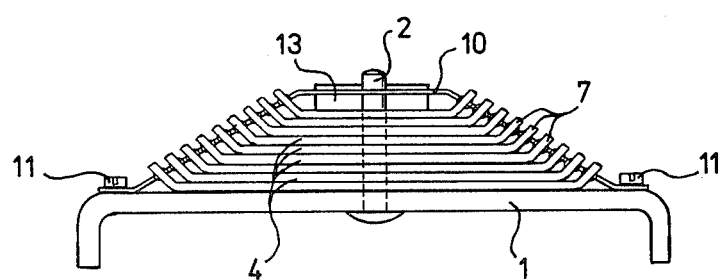

On those drawings it has been represented:

On FIG. 1 a longitudinal section of the machine;

On FIG. 2 a plan view taken on the sectional line II—II of FIG. 1;

On FIG. 3 a perspective view;

On FIG. 4 a side view.

A device according to the invention is illustrated on the annexed drawings and comprises a base plate 1 which is pierced with a series of holes 2¹ along a longitudinal axis, in which the bottom end of upwardly extending rods 2 is fixed.

On both sides of the median axis 3 (FIG. 2) of the plate 1, laminations 4 are stacked on the rods 2.

Those laminations 4 are superposed and come into contact by their juxtaposed edges 12 (FIG. 3) and in each of the laminations oblong slots 5 are provided through which the respective rods 2 are projecting which allow the laminations to slide horizontally outwardly in relation to one another.

At their ends those laminations 4 are provided with lugs or extensions 6 which extend laterally on each side perpendicularly to the longitudinal axis of the lamination thus giving the lamination 4 an H-shaped configuration.

As will be seen from FIGS. 3 and 4, at the lugs or extensions 6 the different laminations have different widths and in a given series of superposed laminations this width is decreasing from the lamination resting directly on the plate 1. Moreover the tip 7 of each lug 6 is bent slightly upwards and each portion 7 has a fixing member 8 for a spring 9.

These springs 9 extend inwardly from the ends of those bent portions 7 to a bridge shaped support 10 which extends over the series of laminations and which is fixed to the base plate 1 by screws 11 or similar organs.

By the action of these springs 9 the inner ends 12 of the two series of laminations are normally held and maintained in contact with one another.

A pressure plate 13 is provided on the top lamination of the stack and is held by two rods 2 extending through apertures 14 in the pressure plate.

The application of pressure on the plate 13 and on the stack of laminations is obtained in the example illustrated by a known device 15 comprising a pressure member 16 carried by an angle lever 17 which is articulated on a plate 18 secured to the casing 19.

On this plate 18 is also articulated an arm 20 with which is pivotally connected a lever 21 connected by a pivot 22 to the angle lever 17 and provided with a pusher 23 so that, when the latter is actuated, the pressure member 16 is pivoted in such a manner to come into contact, through a aperture 24 in casing 19, with the plate 13 and the stack of laminations 4 and to apply pressure to the latter.

When an original key is to be introduced, the pressure member 16 is raised from its compression position to the position shown in FIG. 1 and the original key 25 (FIG. 2) is introduced at 12 (FIG. 3) between the lamination halves 4.

This operation takes place in the same way as the introduction of a key into a lock; in the present case, the key is introduced generally and preferably by causing the back of the key to slide along the base plate 1.

Consequently, as a result of the slots 5, the laminations 4 move apart horizontally on either side of the axis 3 to an extent depending upon the thickness and the section of the key.

At the end of the introduction stroke, the key is stopped by a wedge-shaped notch 26 which is formed in the base plate 1, the tip of the notch pointing towards the laminations.

Each lamination 4 is thus moved so as to adapt to the outer contour of the key section.

The device 15 is then actuated so that the pressure member 16 is applied to the pressure plate 13, so that each lamination 4 is locked in the suitable position.

The original key can now be removed and the copied key can be tested by introducing it into the space previously occupied by the original key.

It will be seen that any difference between the sections of the two keys will result in that the copied key will not be able to penetrate the gap created between the juxtaposed ends of each lamination after the introducing of the original key.

I claim:

1. Device for gauging the section of a flat key duplicated from an original key comprising a base plate, laminations stacked on said base plate extending parallel to said plate and superimposed on the plate, said laminations being divided into two halves which come into contact with their juxtaposed edges in the median plane, each half lamination having lugs extending laterally on each side perpendicular to its longitudinal axis at its end remote from the juxtaposed edge thereof, said lateral lugs being of decreasing length from one lamination to the next following considered from the bottom to the top of the stack of laminations, the end of each lug having a portion bent upwards, holding means extending from the bent portions of said lugs to a member fixed to said base plate for normally maintaining said juxtaposed edges of the half laminations in contact with each other, each half lamination being formed with an elongated slot, rods extending upwardly from said base plate through said slots, said slots permitting the half laminations to slide horizontally outwardly in relation to one another in opposition to said holding means upon the introduction of the original key between said juxtaposed edges of the half laminations to a position corresponding to the cross-sectional profile of said original key, and means for applying a pressure on the stack of laminations to fix the individual half laminations in said position, whereby the cross-sectional profile of the flat key can be checked against that of the original key by removing the latter from between said juxtaposed edges of the half laminations and introducing said flat key therebetween.

2. Device according to claim 1, wherein said holding means comprises spring members, and said fixed member comprises a bridge-shaped support extending transversely over the stack of laminations, said spring members normally biasing the justaposed edges of the half laminations into contact with each other.

3. Device according to claim 2, wherein a pressure plate is provided overlying the stack of laminations, said means for applying a pressure on the stack of laminations being adapted to be brought into operative contact with the said pressure plate.

4. Device according to claim 3, wherein said means for applying a pressure on the stack of laminations comprises a pressure member carried by a set of articulated levers actuated by a pusher.

5. Device according to claim 4, wherein said base plate is provided in the median plane with a guide notch for a key extending in the direction of insertion of the key towards the stack of laminations.

6. Device for testing or checking the section of a flat key which comprises a base plate, a plurality of laminations extending parallel to said base and superimposed to the latter and to one another in stack configuration, each of said laminations being formed of a pair of half-laminations extending in a common plane, each of said half-laminations having a front edge, said half-laminations being slidably mounted in their common plane towards one another up to a position in which said front edges meet one another and become juxtaposed edges thus defining a median plane perpendicular to said common plane, and away from each other at least to the extent necessary for the introduction of a key between said juxtaposed edges of said half-laminations, and means for applying a pressure to the stack of laminations to fix the individual half-laminations in a position which corresponds to the predetermined cross-sectional profile or shape of the flat key to be checked as given in said median plane, each of said half-laminations having at its end remote from said front edge at least one lug extending laterally, the lateral lugs of the various laminations when considered from the bottom to the top of the stack, having a decreasing length from one lamination to the next following and having their ends each time somewhat bent upwards.

* * * * *